(12) United States Patent
Shen et al.

(10) Patent No.: US 11,321,963 B2
(45) Date of Patent: May 3, 2022

(54) FACE LIVENESS DETECTION BASED ON NEURAL NETWORK MODEL

(71) Applicant: HANGZHOU HIKVISION DIGITAL TECHNOLOGY CO., LTD., Hangzhou (CN)

(72) Inventors: Chuan Shen, Hangzhou (CN); Zhihao Ren, Hangzhou (CN); Weichang Kang, Hangzhou (CN)

(73) Assignee: HANGZHOU HIKVISION DIGITAL TECHNOLOGY CO., LTD.

( * ) Notice: Subject to any disclaimer, the term of this patent is extended or adjusted under 35 U.S.C. 154(b) by 7 days.

(21) Appl. No.: 16/959,419

(22) PCT Filed: Dec. 21, 2018

(86) PCT No.: PCT/CN2018/122550
§ 371 (c)(1),
(2) Date: Jun. 30, 2020

(87) PCT Pub. No.: WO2019/134536
PCT Pub. Date: Jul. 11, 2019

(65) Prior Publication Data
US 2020/0334450 A1 Oct. 22, 2020

(30) Foreign Application Priority Data
Jan. 4, 2018 (CN) .......................... 201810007468.1

(51) Int. Cl.
*G06V 40/16* (2022.01)
*G06V 30/194* (2022.01)

(52) U.S. Cl.
CPC .......... *G06V 40/174* (2022.01); *G06V 30/194* (2022.01)

(58) Field of Classification Search
CPC ................. G06K 9/00302; G06K 9/66; G06K 2009/4657; G06K 9/00268;
(Continued)

(56) References Cited

U.S. PATENT DOCUMENTS

2017/0213096 A1* 7/2017 Langley ................ H04W 12/12
2017/0345146 A1* 11/2017 Fan ..................... G06K 9/00228
(Continued)

FOREIGN PATENT DOCUMENTS

CN 101964056 A 2/2011
CN 102542281 A 7/2012
(Continued)

OTHER PUBLICATIONS

EP Extended European Search Report issued in European Application No. 18898093.2, dated Jan. 12, 2021, 9 pages.
(Continued)

*Primary Examiner* — Wesley J Tucker
(74) *Attorney, Agent, or Firm* — Fish & Richardson P.C.

(57) ABSTRACT

A method, an apparatus and an electronic device for face liveness detection based on a neural network model are provided. The method includes: a target visible light image and a target infrared image of a target object to be detected are obtained (S101); a first face image is extracted from the target visible light image, and a second face image is extracted from the target infrared image (S102); a target image array of the target object is generated based on multiple monochromatic components of the first face image and a monochromatic component of the second face image (S103); and feeding the target image array into a pre-trained neural network model for detection, to obtain a face liveness detection result of the target object (S104).

9 Claims, 2 Drawing Sheets

(58) Field of Classification Search
CPC ........... G06K 9/00234; G06K 9/00906; G06K 9/00067; G06K 9/6289; G06K 9/4652; G06K 9/00221
See application file for complete search history.

(56) References Cited

U.S. PATENT DOCUMENTS

| | | | | |
|---|---|---|---|---|
| 2018/0173979 | A1* | 6/2018 | Fan | G06K 9/2036 |
| 2019/0034702 | A1* | 1/2019 | Hong | G06K 9/00288 |
| 2019/0147676 | A1* | 5/2019 | Madzhunkov | H04N 5/232 340/5.2 |
| 2019/0251334 | A1* | 8/2019 | Kawase | G06K 9/00255 |
| 2019/0335098 | A1* | 10/2019 | Guo | G06K 9/00906 |
| 2019/0340349 | A1* | 11/2019 | Kong | G06K 9/00906 |
| 2019/0347823 | A1* | 11/2019 | Yang | G06K 9/00362 |
| 2020/0342245 | A1* | 10/2020 | Lubin | G06K 9/0061 |
| 2021/0166045 | A1* | 6/2021 | Kwak | G06K 9/00288 |
| 2021/0256281 | A1* | 8/2021 | Henson | G06K 9/00288 |
| 2021/0287026 | A1* | 9/2021 | Park | G06K 9/629 |

FOREIGN PATENT DOCUMENTS

| | | |
|---|---|---|
| CN | 102708383 A | 10/2012 |
| CN | 105260731 A | 1/2016 |
| CN | 105513221 A | 4/2016 |
| CN | 105518711 A | 4/2016 |
| CN | 105654028 A | 6/2016 |
| CN | 105956572 A | 9/2016 |
| CN | 106203305 A | 12/2016 |
| CN | 106203373 A | 12/2016 |
| CN | 106372601 A | 2/2017 |
| CN | 106778607 A | 5/2017 |
| CN | 107066942 A | 8/2017 |
| CN | 107122744 A | 9/2017 |

OTHER PUBLICATIONS

Prince Simon, "Chapter 13: Image preprocessing and feature extraction", Computer Vision Models, Learning, and Inference, Feb. 2, 2012, 26 pages.
ISA State Intellectual Property Office of the People's Republic of China, International Search Report Issued in Application No. PCT/CN2018/122550, dated Mar. 22, 2019, WIPO, 4 pages (with English translation).
Office Action issued in Chinese Application No. 201810007468.1 dated Aug. 27, 2020, 20 pages (with English Translation).
Xiao et al., "Principles and Applications of Computer Graphics", Xidian University Press, Jun. 30, 2014, 3 pages.

* cited by examiner

FACE LIVENESS DETECTION BASED ON NEURAL NETWORK MODEL

CROSS-REFERENCE TO RELATED APPLICATION

The present application is a continuation of International Application No. PCT/CN2018/122550 filed on Dec. 21, 2018, which claims the priority to Chinese patent application 201810007468.1, titled "method, apparatus and electronic device for face liveness detection based on a neural network model" filed on Jan. 4, 2018, all of which are incorporated herein by reference in their entireties.

TECHNICAL FIELD

The present disclosure relates to the field of face recognition, specifically, to face liveness detection based on a neural network model.

BACKGROUND

With the rapid development of biometric recognition technology, technologies such as face recognition, fingerprint recognition, iris recognition, etc. play an important role in identity verification. Among them, face recognition is a more convenient and intuitive technology, and has been widely used.

As an effective identity verification method today, face recognition has expanded its application to: work attendance, security, customs inspection, criminal investigation, banking system, etc. However, with the expansion of its application, some problems also emerge, for example, criminals fake users' face features to cheat the system during the process of face verification. Specifically, cheating in the face verification process mainly includes: cheating using stolen user photos, using videos captured in public places or from the Internet, etc. In order to perform identity verification and detect the authenticity of identity sources more safely, it is particularly important to detect whether an object to be recognized is of a live body.

SUMMARY

In view of this, the present application provides a method, an apparatus and an electronic device for face liveness detection based on a neural network model to quickly and effectively detect whether a target object is a human face live body.

Specifically, the present application is implemented through the following technical solutions.

In a first aspect, the present application provides a face liveness detection method based on a neural network model, including: obtaining a target visible light image and a target infrared image of a target object to be detected; extracting, from the target visible light image, a first face image containing only a face part and extracting, from the target infrared image, a second face image containing only the face part; generating a target image array of the target object based on multiple monochromatic components of the first face image and a monochromatic component of the second face image; and feeding the target image array into a neural network model pre-trained for detection, to obtain a face liveness detection result of the target object.

Optionally, the neural network model may be trained in the following manner including: a visible light image and an infrared image of each of a plurality of samples are obtained, where sample types of the plurality of samples include positive samples and negative samples, the positive samples are live-body objects, and the negative samples are non-live-body objects; for each of the plurality of samples, a first sample image containing only a face part is extracted from the visible light image of the sample and a second sample image containing only the face part is extracted from the infrared image of the sample; a target image array of the sample is generated based on multiple monochromatic components of the first sample image and a monochromatic component of the second sample image; and a pre-initialized neural network model is trained based on the target image array of each of the plurality of samples and the sample type of each of the plurality of samples.

Optionally, generating the target image array of the target object based on the multiple monochromatic components of the first face image and the monochromatic component of the second face image includes: using each of the multiple monochromatic components of the first face image and the monochromatic component of the second face image as one-dimensional data, respectively, to constitute the target image array of the target object with multi-dimension.

Optionally, generating the target image array of the target object based on the multiple monochromatic components of the first face image and the monochromatic component of the second face image includes: performing dimensionality reduction on a combination of the multiple monochromatic components of the first face image and the monochromatic component of the second face image to obtain a target grayscale image; and using one-dimensional data corresponding to the target grayscale image to constitute the target image array of the target object with one-dimension.

Optionally, generating the target image array of the target object based on the multiple monochromatic components of the first face image and the monochromatic component of the second face image includes: performing image preprocessing on the first face image and the second face image; and determining the target image array of the target object based on multiple monochromatic components of the preprocessed first face image and a monochromatic component of the preprocessed second face image.

In a second aspect, the present application provides a face liveness detection apparatus based on a neural network model, including: an image obtaining unit, configured to obtain a target visible light image and a target infrared image of the target object to be detected; a face image extracting unit, configured to extract, from the target visible light image, a first face image containing only a face part and extract, from the target infrared image, a second face image containing only the face part; a target image array generating unit, configured to generate a target image array of the target object based on multiple monochromatic components of the first face image and a monochromatic component of the second face image; and a determining unit, configured to feed the target image array into a neural network model pre-trained for detection, to obtain a face liveness detection result of the target object.

Optionally, the neural network model is trained by a model training unit, and the model training unit is configured to: obtain a visible light image and an infrared image of each of a plurality of samples, where sample types of the plurality of samples include positive samples and negative samples, the positive samples are live-body objects, and the negative samples are non-live-body objects; for each of the plurality of samples, extract, from the target visible light image, a first face image containing only a face part and extract, from the target infrared image, a second face image containing only the face part; generate a target image array of the sample based on multiple monochromatic components of the first sample image and the monochromatic component of the second sample image; and train a pre-initialized neural network model based on the target image array of each of the plurality of samples and the sample type of each of the plurality of samples.

Optionally, the target image array generating unit is specifically configured to use each of the multiple monochromatic components of the first face image and the monochromatic component of the second face image as one-dimensional data, respectively, to constitute the target image array of the target object with multi-dimension.

Optionally, the target image array generating unit is specifically configured to perform dimensionality reduction on a combination of the multiple monochromatic components of the first face image and the monochromatic component of the second face image to obtain a target grayscale image; and use one-dimensional data corresponding to the target grayscale image to constitute the target image array of the target object with one-dimension.

Optionally, the target image array generating unit is specifically configured to perform image preprocessing on the first face image and the second face image; and determine the target image array of the target object based on multiple monochromatic components of the preprocessed first face image and a monochromatic component of the preprocessed second face image.

In a third aspect, the present application also provides an electronic device, including: an internal bus, a memory, a processor, and a communications interface; where the processor, the communications interface, and the memory communicate with each other through the internal bus; the memory is configured to store machine-readable instructions corresponding to a face liveness detection method based on a neural network model; and the processor is configured to read and execute the machine-readable instructions on the memory to implement the face liveness detection method based on a neural network model provided by the first aspect of the present application.

In the solution provided in the present application, based on the multi-spectral analyses, the images in the visible light wavelength range and the infrared wavelength range are used to fully characterize the target object; and, based on the statistical characteristics of the reflection of light of different wavelength ranges on human faces, multi-wavelength range face images are extracted from the visible light image corresponding to the visible light wavelength range and from the infrared image corresponding to the infrared wavelength range, and then a neural network model is used to analyze the extracted face images to determine whether the target object is a human face live body. Therefore, the present solution can quickly and effectively detect whether the target object is a human face live body.

DETAILED DESCRIPTION OF THE EMBODIMENTS

Figure 1:
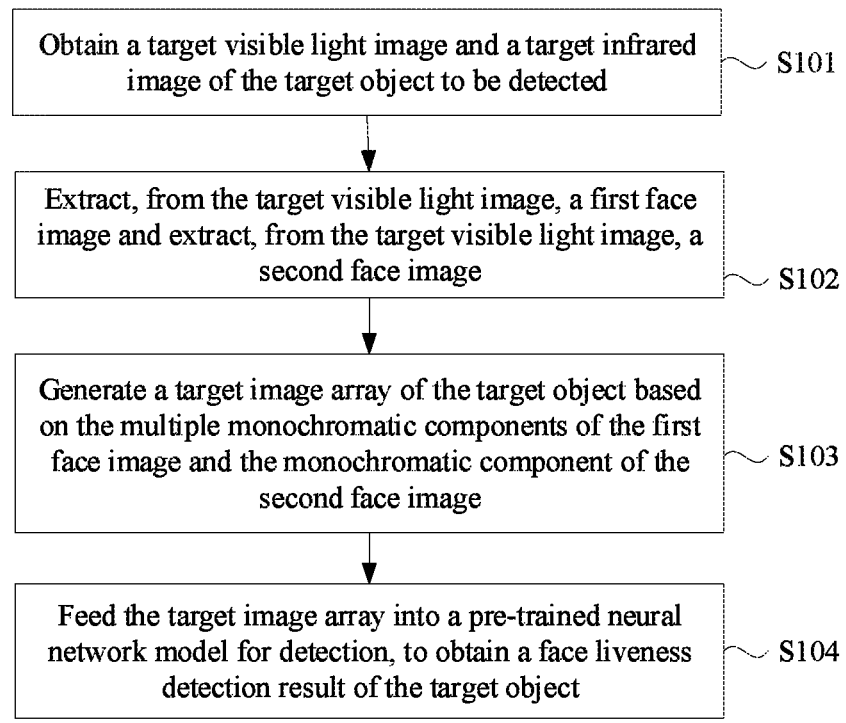
FIG. 1 is a flowchart of a face liveness detection method based on a neural network model provided by the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Terms used in the present application are for the purpose of describing specific embodiments only, and are not intended to limit the present application. The singular forms "a/an", "said" and "the" used in the present disclosure and the appended claims are also intended to include the plural form unless the context clearly indicates otherwise. It should also be understood that the term "and/or" as used herein refers to and encompasses any or all possible combinations of one or more associated listed items.

It should be understood that although the terms "first", "second", "third", etc. may be used to describe various information in this application, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used here can be interpreted as "when" or "upon" or "in response to determination".

The present application provides a method, an apparatus and an electronic device for face liveness detection based on a neural network model to quickly and effectively detect whether a target object is of a live body.

The face liveness detection method based on a neural network model provided by the present application is first described below.

It should be noted that the face liveness detection method based on a neural network model can be applied to an electronic device: In a specific application, the electronic device may include a device equipped with the function of acquiring visible light images and infrared images, such as a camera, an attendance machine, etc., or a device that communicates with a device equipped with the function of acquiring visible light images and infrared images, such as a server, a personal computer, etc.

Considering the related principle of multispectral imaging, that is, different objects may have different imaging effects in a light wavelength range, and an object may have different imaging effects in different light wavelength ranges, the present application uses a visible light image corresponding to the visible light wavelength range (380 nm-780 nm) and an infrared image corresponding to the infrared wavelength range (780 nm-1100 nm), to fully characterize the image information of a target object.

In addition, the reflection of light in any light wavelength range on human face skin has significant and stable statistical characteristics, so that the distribution of grayscale values in the grayscale images corresponding to the monochromatic components of the human face image is uniform and continuous, that is, the grayscale values change mildly, while for a human face in a photo (may also be referred to as a fake human face), the situation is just the opposite. Therefore, in the present application, real and fake human faces are distinguished based on the characteristics of human face images.

It should be noted that the face image extracted from the infrared image corresponding to the infrared wavelength range is less affected by external light, has stable characteristics, and contains significant information on the face, the pupils, etc. Therefore, infrared images acquired in infrared wavelength range can be used for face liveness detection. In specific applications, the wavelength in which the infrared image is acquired can be 850 nm, 940 nm or others. In addition, the image acquired in the infrared wavelength range can be directly stored by the image sensor in the form of an 8-bit grayscale image with 256 shades.

As shown in FIG. 1, the present application provides a face liveness detection method based on a neural network model, including steps S101 to S104.

At S101, a target visible light image and a target infrared image of a target object to be detected are obtained.

When it is to detect whether the target object is of a live body, the electronic device can obtain a target visible light image and a target infrared image of the target object to be detected, and then perform subsequent face extraction.

It should be noted that the target visible light image and the target infrared image of the target object are two types of images of the target object acquired at the same time. In addition, under the premise of ensuring that the target visible light image and the target infrared image are acquired at the same time, a single device can be used to acquire the two types of images, for example, the single device is a dual lens camera, one lens being provided with a filter so that the image sensor corresponding to the lens only senses the infrared wavelength range. Surely the two types of images can also be acquired by two devices, such as a visible light image acquisition device and a dedicated infrared image acquisition device.

The target visible light image can be acquired by a CCD (charge-coupled device), a CMOS (complementary metal oxide semiconductor) or other imaging sensors. In addition, the color space corresponding to the target visible light image acquired in the present application may be RGB, YUV, or HIS, etc. In order to ensure the detection effectiveness, when the color space of the visible light image is different from that of the training samples of the neural network model mentioned later, a color space conversion on the target visible light image can be performed, and then the converted target visible light image can be used to perform the subsequent steps. For the RGB color space, various colors are obtained by changing and adding together three-color channels of red (R), green (G), and blue (B), where R, G, and B represent the colors of three channels red, green, and blue, respectively. For the YUV color space, "Y" represents luminance or luma, "U" and "V" represent chrominance or chroma. For the HIS color space, colors are described based on the human visual system, using hue, saturation (or chroma), and intensity (or brightness).

At S102, a first face image is extracted from the target visible light image, and a second face image is extracted from the target infrared image. Both the first face image and the second face image are images containing only a face part.

After obtaining the target visible light image and the target infrared image, since the reflection of light in any light wavelength range on human face skin has significant and stable statistical characteristics, analyses can be performed on only the face part in the target visible light image and the target infrared image.

Extracting the first face image from the target visible light image may include: performing face recognition on the target visible light image to obtaining a face area; and extracting the face area to obtain the first face image. Similarly, extracting the second face image from the target infrared image may include: performing face recognition on the target infrared image to obtain a face area; and extracting the face area to obtain the second face image. Any face recognition algorithm well-known in the art may be used to perform the face recognition on the target visible light image and the target infrared image, which is not limited herein.

If a face area is recognized in both the target visible light image and the target infrared image, it may be determined that the target object may be of a live body or a non-live body, and a liveness detection needs to be performed on the target object in the subsequent steps. However, if no face area is recognized from the target visible light image or the target infrared image, it may be determined that the target object may be of a non-live body, or the target object may be acquired incorrectly. Therefore, in a specific application, when no face area can be recognized from the target visible light image or the target infrared image, the target object can be directly determined as a non-human face live body, and the process is ended. Alternatively, when no face area can be recognized from the target visible light image or the target infrared image, the process may also return to step S101 to reacquire the target visible light image and target infrared image of the target object.

An example of the case where no face area can be recognized from the target infrared image: when the target object is a screen displaying a human face, a face area can be recognized from the target visible light image, but not from the target infrared image.

At S103, a target image array of the target object is generated based on multiple monochromatic components of the first face image and a monochromatic component of the second face image.

After obtaining the first face image and the second face image, a target image array corresponding to the target object can be determined based on the multiple monochromatic components of the first face image and the monochromatic component of the second face image. Any of the monochromatic components is a matrix of w*h, where w represents the number of pixels widthwise and h represents the number of pixels lengthwise. It can be understood that the types of the multiple monochromatic components of the first face image are related to the corresponding color space. For example, in the case where the color space of the first face image is RGB, the multiple monochromatic components are R component, G component and B component; and in the case where the color space of the first face image is YUV, the multiple monochromatic components are Y component, U component, V component, and so on.

Optionally, in a specific implementation, generating a target image array of the target object based on the multiple monochromatic components of the first face image and the monochromatic component of the second face image may include: using each of the multiple monochromatic components of the first face image and the monochromatic component of the second face image as one-dimensional data, respectively, to constitute the target image array of the target object with multi-dimension.

In this specific implementation, each dimension of the target image array corresponds to a monochromatic component, that is, the target image array is a four-dimensional array. For example, in the case where the color space corresponding to the first face image is RGB, the target image array is [infrared component, R component, G component and B component]; and in the case where the color space corresponding to the first face image is YUV, the target image array is [infrared component, Y component, U component, V component], and so on.

Optionally, in another specific implementation, generating a target image array of the target object based on the multiple monochromatic components of the first face image and the monochromatic component of the second face image may include: performing dimensionality reduction on a combination of the multiple monochromatic components of the first face image and the monochromatic component of the second face image to obtain a target grayscale image; and using one-dimensional data corresponding to the target grayscale image as the target image array of the target object with one-dimension.

The dimensionality reduction is to merge the multiple dimensions of monochromatic components into a grayscale image. The dimensionality reduction can be performed specifically in, but is not limited to, the following manner including: for each of pixels, weighted averaging is performed on component data of the pixel in each monochromatic component, so that each pixel corresponds to a result value, and a grayscale image is obtained.

It should be emphasized that, in specific applications, images acquired by image acquisition device usually have noise interference, and images acquired in different scenarios may have different imaging characteristics, such as resolution, size, etc., which all have an impact on detection. Therefore, in order to eliminate such impact, the image can be preprocessed.

Based on this, generating a target image array of the target object based on the multiple monochromatic components of the first face image and the monochromatic component of the second face image may include: performing image preprocessing on the first face image and the second face image; and determining a target image array of the target object based on the multiple monochromatic components of the preprocessed first face image and the monochromatic component of the preprocessed second face image.

The image preprocessing may include, but it is not limited to, at least one of denoising, histogram equalization, or size normalization. Furthermore, it can be understood that the image preprocessing in the face liveness detection can be performed in the same manner as the image preprocessing performed on the training samples of the neural network model to ensure the effectiveness of the detection. In addition, specific implementation methods for denoising, histogram equalization, and size normalization are all techniques well known to those skilled in the art, and are not limited herein.

It should be emphasized how specifically a target image array of the target object is generated based on the multiple monochromatic components of the first face image and the monochromatic component of the second face image is merely illustrative and constitutes no limitation to the present application.

At S104, the target image array is fed into a pre-trained neural network model for detection, and a face liveness detection result of the target object is obtained.

After a target image array of the target object is obtained, the target image array may be fed into a pre-trained neural network model for detection, to obtain a face liveness detection result corresponding to the target object. The face liveness detection result may include that the target object is a human face live body or that the target object is a non-human face live body.

It is understandable that by learning the image characteristics of live bodies and non-live bodies, the neural network model can be used to identify whether the target object is a human face live body. The type and the specific hierarchical structure of the neural network model can be set according to the actual situation, is not limited herein. In specific applications, the neural network model can include a CNN (convolutional neural network), an RNN (recurrent neural network), a DNN (deep neural network), etc.

Figure 2:
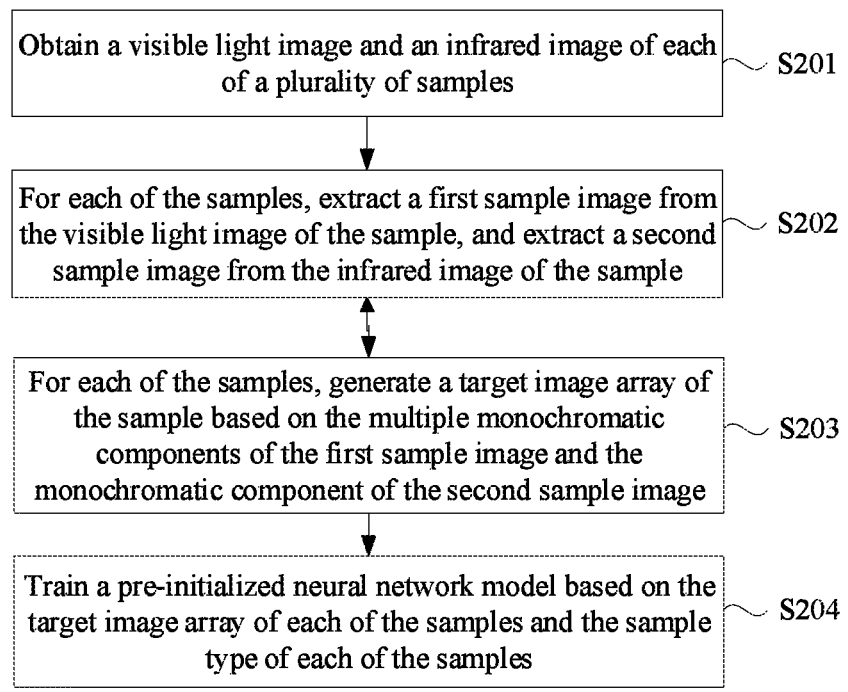
FIG. 2 is a flowchart of a training process of a neural network model provided by the present application.

Specifically, as shown in FIG. 2, the training process of the neural network model includes steps S201 to S204.

At S201, a visible light image and an infrared image of each of a plurality of samples are obtained.

The sample types of the samples include positive samples and negative samples. The positive samples are live-body objects, and the negative samples are non-live-body objects.

The samples used in training the neural network model may be acquired in a variety of environments, such as indoor, outdoor, strong background light, and other environments with different lighting conditions, so that the neural network model can be subsequently applied to the detection of target objects of which the images are acquired in a variety of environments.

In addition, the non-live-body samples may include photos, videos, etc., where the photos may include black and white photos and color photos, and the carrier of the video may be a display device such as a mobile phone or a tablet computer.

Furthermore, a visible light image and an infrared image of a sample are two types of images of the sample acquired at the same time. In addition, under the premise of ensuring that the visible light image and the infrared image are acquired at the same time, a single device can be used to acquire the two types of images. Surely the two types of images can also be acquired by two devices.

At S202, for each of the samples, a first sample image of the sample is extracted from the visible light image of the sample, and a second sample image of the sample is extracted from the infrared image of the sample.

Both the first sample image and the second sample image are images containing only a face part.

Extracting a first sample image from the visible light image of the sample may include: performing face detection on the visible light image of the sample to obtain a face area; and extracting the face area to obtain the first sample image. Similarly, extracting a second sample image from the infrared image of the sample may include: performing a face detection on the infrared image of the sample to obtain a face area; and extracting the face area to obtain the second sample image. Any face detection algorithm well-known in the art may be used to perform the face detection on the visible light image and the infrared image of the sample, which is not limited herein.

It is understandable that, if no face area is recognized from the visible light image or the infrared image of the sample, it may be determined that the sample may be of a non-live body, or the sample may be acquired incorrectly. If the sample is of a non-live body, the visible light image or the infrared image with no recognized face area can be directly used as the corresponding face image, and then the subsequent processing steps can be performed.

At S203, for each of the samples, a target image array of the sample is generated based on the multiple monochromatic components of the first sample image and the monochromatic component of the second sample image.

After obtaining the first sample image and the second sample image of the sample, a target image array of the sample can be determined based on the multiple monochromatic components corresponding to the first sample image of the sample and the monochromatic component of the second sample image of the sample. Any of the monochromatic components is a matrix of w*h, where w represents the number of pixels widthwise and h represents the number of pixels lengthwise.

Optionally, in a specific implementation, generating a target image array of the sample based on the multiple monochromatic components corresponding to the first sample image of the sample and the monochromatic component of the second sample image of the sample may include: using each of the multiple monochromatic components of the first sample image of the sample and the monochromatic component of the second sample image of the sample as one-dimensional data, respectively, to constitute a target image array corresponding to the sample with multi-dimension.

Optionally, in another specific implementation, generating a target image array of the sample based on the multiple monochromatic components corresponding to the first sample image of the sample and the monochromatic component of the second sample image of the sample may include: performing dimensionality reduction on a combination of the multiple monochromatic components of the first sample image of the sample and the monochromatic component of the second sample image of the sample to obtain a target grayscale image; and using one-dimensional data corresponding to the target grayscale image of the sample to constitute a target image array of the sample with one-dimension.

It can be understood that, in order to ensure the validity of the detection, the target image arrays of the training samples are determined in the same manner as the target image array of the target objects.

In addition, before the target image array of the sample is determined, an image preprocessing can be performed on the first sample image and the second sample image of the sample, and then the target image array of the sample is determined based on the preprocessed first sample image and the preprocessed second sample image. The image preprocessing may include, but it is not limited to, at least one of denoising, histogram equalization, or size normalization.

At S204, a pre-initialized neural network model is trained based on the target image array of each of the samples and the sample type of each of the samples.

After obtaining the target image array of each of the samples, a pre-initialized neural network model may be trained based on the target image array of each of the samples and the sample type each of the samples, until the neural network model learns the relationship between the target image array of each of the samples and the sample type of each of the samples. As to how specifically a pre-initialized neural network model is trained based on the target image array of each of the samples and the sample type each of the samples, reference can be made to any specific implementation of training the neural network model with sample data well known to those skilled in the art, which will not be described here.

In the solution provided in the present application, based on the multi-spectral analyses, the images in the visible light wavelength range and the infrared wavelength range are used to fully characterize the target object; and, based on the statistical characteristics of the reflection of light of different wavelength ranges on human faces, face images are extracted from the visible light image corresponding to the visible light wavelength range and from the infrared image corresponding to the infrared wavelength range, and then a neural network model is used to analyze the extracted multi-wavelength range face images to determine whether the target object is a human face live body. Therefore, the present solution can quickly and effectively detect whether the target object is a human face live body.

Figure 3:
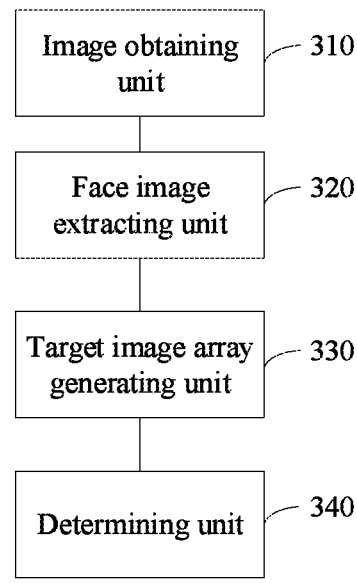
FIG. 3 is structural diagram of a face liveness detection apparatus based on a neural network model provided by the present application.

Corresponding to the above method embodiments, the present application also provides a face liveness detection apparatus based on a neural network model. As shown in FIG. 3, the apparatus may include:

an image obtaining unit 310, configured to obtain a target visible light image and a target infrared image of a target object to be detected;

a face image extracting unit 320, configured to extract a first face image containing only a face from the target visible light image, and a second face image containing only the face from the target infrared image;

a target image array generating unit 330, configured to generate a target image array of the target object based on the multiple monochromatic components of the first face image and the monochromatic component of the second face image; and a determining unit 340, configured to feed the target image array into a pre-trained neural network model for detection, to obtain a face liveness detection result of the target object.

In the solution provided in the present application, based on the multi-spectral analyses, the images in the visible light wavelength range and the infrared wavelength range are used to fully characterize the target object; and, based on the statistical characteristics of the reflection of light of different wavelength ranges on human faces, face images are extracted from the visible light image corresponding to the visible light wavelength range and from the infrared image corresponding to the infrared wavelength range, and then a neural network model is used to analyze the extracted multi-wavelength range face images to determine whether the target object is a human face live body. Therefore, the present solution can quickly and effectively detect whether the target object is a human face live body.

Optionally, the neural network model is obtained by training a model training unit, and the model training unit is specifically configured to: obtain a visible light image and an infrared image of each of a plurality of samples, where the sample types of the plurality of samples include positive samples and negative samples, the positive samples are live-body objects, and the negative samples are non-live-body objects; for each of the plurality of samples, extract a first sample image from the visible light image of the sample and extract a second sample image from the infrared image of the sample, where both the first sample image and the second sample image are images containing only a face part; for each of the samples, generate a target image array of the sample based on the multiple monochromatic components of the first sample image of the sample and the monochromatic component of the second sample image of the sample; and train a pre-initialized neural network model based on the target image array of each of the samples and the sample type of each of the samples.

Optionally, in a specific implementation, the target image array generating unit 330 is specifically configured to use each of the multiple monochromatic components of the first face image and the monochromatic component of the second face image as one-dimensional data, respectively, to constitute the target image array of the target object with multi-dimension.

Optionally, in another specific implementation, the target image array generating unit 330 is specifically configured to perform dimensionality reduction on a combination of the multiple monochromatic components of the first face image and the monochromatic component of the second face image to obtain a target grayscale image; and use one-dimensional data corresponding to the target grayscale image to constitute the target image array of the target object with one-dimension.

Optionally, the target image array generating unit 330 is specifically configured to perform image preprocessing on the first face image and the second face image; and determine a target image array of the target object based on the multiple monochromatic components of the preprocessed first face image and the monochromatic component of the preprocessed second face image.

Figure 4:
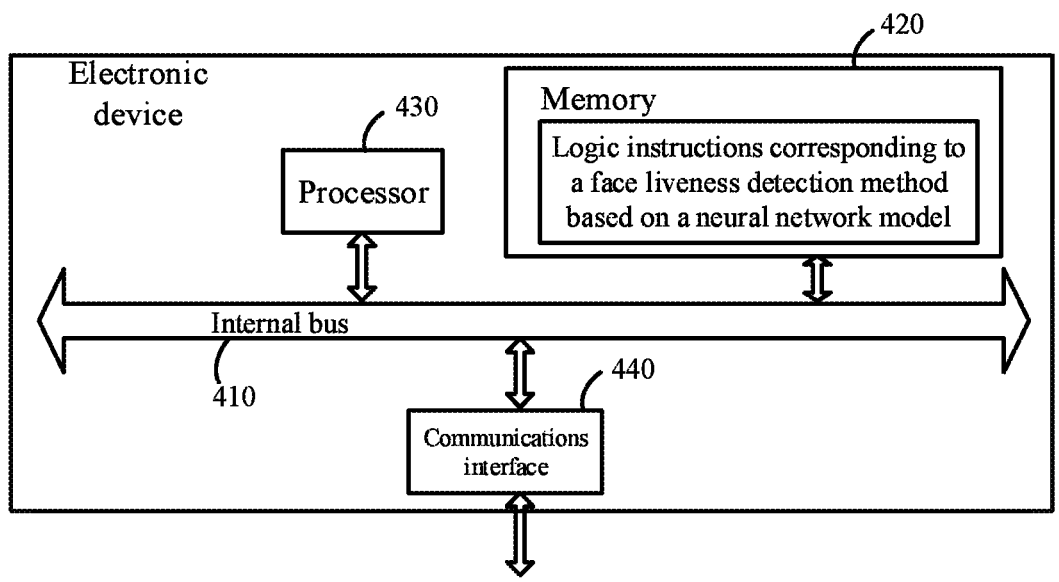
FIG. 4 is a structural diagram of an electronic device provided by the present application.

Corresponding to the above method embodiments, an embodiment of the present application further provides an electronic device; as shown in FIG. 4, the electronic device includes: an internal bus 410, a memory 420, a processor 430, and a communications interface 440 where the processor 430, the communications interface 440, and the memory 420 communicate with each other through the internal bus 410.

The memory 420 is configured to store machine-readable instructions corresponding to a face liveness detection method based on a neural network model.

The processor 430 is configured to read and execute the machine-readable instructions on the memory 420 to implement a face liveness detection method based on a neural network model provided by the present application. A face liveness detection method based on a neural network model may include: obtaining a target visible light image and a target infrared image of the target object to be detected; extracting, from the target visible light image, a first face image containing only the face part and extracting, from the target infrared image, a second face image containing only the face part; generating a target image array of the target object based on the multiple monochromatic components of the first face image and the monochromatic component of the second face image; and feeding the target image array into a pre-trained neural network model for detection, to obtain a face liveness detection result of the target object.

In this embodiment, for the description of the specific steps of the face liveness detection method, reference can be made to the description in the method embodiments provided in the present application, which is not described here.

For how the functions and effects of the units in the above apparatus are implemented, reference can be made to the implementation process of the corresponding steps in the above methods, which is not described here. Since the device embodiments essentially correspond to the method embodiments, reference can be made to the description of related parts of the method embodiments. The device embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the solutions of the present application. Those of ordinary skill in the art can understand and implement the solutions without any creative efforts.

The above are only some embodiments of the present disclosure and are not intended to limit the present application. Any modification, equivalent replacement, improvement, etc., made within the spirit and principles of the present application, should be included within the scope of protection of the present application.

The invention claimed is:

1. A face liveness detection method based on a neural network model, comprising:
    obtaining a target visible light image and a target infrared image of a target object to be detected;
    extracting, from the target visible light image, a first face image containing only a face part;
    extracting, from the target infrared image, a second face image containing only the face part;
    generating a target image array of the target object based on multiple monochromatic components of the first face image and a monochromatic component of the second face image; and
    feeding the target image array into a neural network model pre-trained for detection, to obtain a face liveness detection result of the target object,
    wherein generating the target image array of the target object based on the multiple monochromatic components of the first face image and the monochromatic component of the second face image comprises:
        performing dimensionality reduction on a combination of the multiple monochromatic components of the first face image and the monochromatic component of the second face image to obtain a target grayscale image, and
        using one-dimensional data corresponding to the target grayscale image to constitute the target image array of the target object with one-dimension.

2. The method of claim 1, wherein the neural network model is trained by
    obtaining a visible light image and an infrared image of each of a plurality of samples, wherein sample types of the plurality of samples include positive samples and negative samples, the positive samples are live-body objects, and the negative samples are non-live-body objects;
    for each of the plurality of samples,
        extracting a first sample image containing only a face part from the visible light image of the sample;
        extracting a second sample image containing only the face part from the infrared image of the sample;
        generating a target image array of the sample based on multiple monochromatic components of the first sample image and a monochromatic component of the second sample image; and
    training a pre-initialized neural network model based on the target image array of each of the plurality of samples and a sample type of each of the plurality of samples.

3. The method of claim 1, wherein generating the target image array of the target object based on the multiple monochromatic components of the first face image and the monochromatic component of the second face image comprises:
    performing image preprocessing on the first face image and the second face image; and
    determining the target image array of the target object based on multiple monochromatic components of the preprocessed first face image and a monochromatic component of the preprocessed second face image.

4. An electronic device, comprising:
at least one processor; and
one or more memories coupled to the at least one processor and storing programming instructions for execution by the at least one processor to perform operations comprising:
 obtaining a target visible light image and a target infrared image of a target object to be detected;
 extracting, from the target visible light image, a first face image containing only a face part;
 extracting, from the target infrared image, a second face image containing only the face part;
 generating a target image array of the target object based on multiple monochromatic components of the first face image and a monochromatic component of the second face image; and
 feeding the target image array into a neural network model pre-trained for detection, to obtain a face liveness detection result of the target object,
 wherein generating the target image array of the target object based on the multiple monochromatic components of the first face image and the monochromatic component of the second face image comprises:
  performing dimensionality reduction on a combination of the multiple monochromatic components of the first face image and the monochromatic component of the second face image to obtain a target grayscale image, and
  using one-dimensional data corresponding to the target grayscale image to constitute the target image array of the target object with one-dimension.

5. The electronic device of claim 4, wherein the operations further comprise: training the neural network model, wherein training the neural network model comprises:
 obtaining a visible light image and an infrared image of each of a plurality of samples, wherein sample types of the plurality of samples include positive samples and negative samples, the positive samples are live-body objects, and the negative samples are non-live-body objects;
 for each of the plurality of samples,
  extracting a first sample image containing only a face part from the visible light image of the sample;
  extracting a second sample image containing only the face part from the infrared image of the sample;
  generating a target image array of the sample based on multiple monochromatic components of the first sample image and a monochromatic component of the second sample image; and
 training a pre-initialized neural network model based on the target image array of each of the plurality of samples and a sample type of each of the plurality of samples.

6. The electronic device of claim 4, wherein generating the target image array of the target object based on the multiple monochromatic components of the first face image and the monochromatic component of the second face image comprises:
 performing image preprocessing on the first face image and the second face image; and
 determining the target image array of the target object based on multiple monochromatic components of the preprocessed first face image and a monochromatic component of the preprocessed second face image.

7. A non-transitory computer readable storage medium coupled to at least one processor and having machine-executable instructions stored thereon that, when executed by the at least one processor, cause the at least one processor to perform operations comprising:
 obtaining a target visible light image and a target infrared image of a target object to be detected;
 extracting, from the target visible light image, a first face image containing only a face part;
 extracting, from the target infrared image, a second face image containing only the face part;
 generating a target image array of the target object based on multiple monochromatic components of the first face image and a monochromatic component of the second face image; and
 feeding the target image array into a neural network model pre-trained for detection, to obtain a face liveness detection result of the target object,
 wherein generating the target image array of the target object based on the multiple monochromatic components of the first face image and the monochromatic component of the second face image comprises:
  performing dimensionality reduction on a combination of the multiple monochromatic components of the first face image and the monochromatic component of the second face image to obtain a target grayscale image, and
  using one-dimensional data corresponding to the target grayscale image to constitute the target image array of the target object with one-dimension.

8. The non-transitory computer readable storage medium of claim 7, wherein the operations further comprise training the neural network model,
 wherein training the neural network model comprises:
  obtaining a visible light image and an infrared image of each of a plurality of samples, wherein sample types of the plurality of samples include positive samples and negative samples, the positive samples are live-body objects, and the negative samples are non-live-body objects;
  for each of the plurality of samples,
   extracting a first sample image containing only a face part from the visible light image of the sample;
   extracting a second sample image containing only the face part from the infrared image of the sample;
   generating a target image array of the sample based on multiple monochromatic components of the first sample image and a monochromatic component of the second sample image; and
  training a pre-initialized neural network model based on the target image array of each of the plurality of samples and a sample type of each of the plurality of samples.

9. The non-transitory computer readable storage medium of claim 7, wherein generating the target image array of the target object based on the multiple monochromatic components of the first face image and the monochromatic component of the second face image comprises:
 performing image preprocessing on the first face image and the second face image; and
 determining the target image array of the target object based on multiple monochromatic components of the preprocessed first face image and a monochromatic component of the preprocessed second face image.

* * * * *